(12) United States Patent
Jiang et al.

(10) Patent No.: US 11,747,709 B2
(45) Date of Patent: Sep. 5, 2023

(54) CHALCOGENIDE OPTICAL RING RESONATORS FOR GENERATING QUANTUM-CORRELATED PHOTON PAIRS

(71) Applicant: CORNING INCORPORATED, Corning, NY (US)

(72) Inventors: Wei Jiang, Vestal, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/619,065

(22) PCT Filed: Jun. 16, 2020

(86) PCT No.: PCT/US2020/037852
§ 371 (c)(1),
(2) Date: Dec. 14, 2021

(87) PCT Pub. No.: WO2020/263616
PCT Pub. Date: Dec. 30, 2020

(65) Prior Publication Data
US 2022/0299839 A1    Sep. 22, 2022

Related U.S. Application Data

(60) Provisional application No. 62/868,281, filed on Jun. 28, 2019.

(51) Int. Cl.
*G02F 1/35* (2006.01)
*G02F 1/365* (2006.01)

(52) U.S. Cl.
CPC .......... *G02F 1/3526* (2013.01); *G02F 1/3536* (2013.01); *G02F 1/365* (2013.01)

(58) Field of Classification Search
None
See application file for complete search history.

(56) References Cited

U.S. PATENT DOCUMENTS 9,268,195 B1    2/2016  Camacho
10,175,556 B2 *  1/2019  Reimer ................. B82Y 10/00
(Continued)

OTHER PUBLICATIONS

Ferrera M et al, "Ultra-low power nonlinear optics in a high Q CMOS compatible integrated micro-ring resonator", Optics Express vol. 17, Issue 16, Nov. 2017, pp. 7.
(Continued)

*Primary Examiner* — Rhonda S Peace
(74) *Attorney, Agent, or Firm* — Svetlana Z. Short

(57) ABSTRACT

An optical ring resonator that includes a closed loop core, a cladding layer, and one or more bus waveguides. The closed loop core is disposed in the cladding layer and is $As_2Se_3$ glass. The one or more bus waveguides are disposed in the cladding layer and are optically coupled to the closed loop core. The closed loop core has a zero-dispersion wavelength within a telecommunication wavelength band. The closed loop core has a plurality of resonant modes, including a zero-dispersion resonant mode corresponding with the zero-dispersion wavelength and a plurality of paired resonant modes. Further, the closed loop core has a phase matching bandwidth extending greater than ±40 nm from the zero-dispersion wavelength.

18 Claims, 11 Drawing Sheets

(56) References Cited

U.S. PATENT DOCUMENTS

| | | |
|---|---|---|
| 11,009,771 B1* | 5/2021 | Vidrighin .............. G02F 1/3536 |
| 2003/0231826 A1 | 12/2003 | Boyd et al. |
| 2018/0081255 A1 | 3/2018 | Reimer et al. |
| 2022/0299839 A1* | 9/2022 | Jiang .................. G02B 6/12007 |

OTHER PUBLICATIONS

International Search Report and Written Opinion of the International Searching Authority; PCT/US2020/037852; dated Sep. 28, 2020; pp. 12; European Patent Office.

Pan Ma et al, "High Q factor chalcogenide ring resonators for cavity-enhanced MIR spectroscopic sensing", Optics Express, vol. 23, No. 15, Jul. 2015, pp. 12.

* cited by examiner

CHALCOGENIDE OPTICAL RING RESONATORS FOR GENERATING QUANTUM-CORRELATED PHOTON PAIRS

CROSS-REFERENCE TO RELATED APPLICATIONS

This application claims the benefit of priority under 35 U.S.C. § 371 of International Application No. PCT/US2020/037852, filed on Jun. 16, 2020, which claims the benefit of priority under 35 U.S.C. § 119 if U.S. Provisional Application No. 62/868,281, filed Jun. 28, 2019, the content of which is incorporated herein by reference in its entirety.

BACKGROUND

The present disclosure relates to apparatuses and systems for generating quantum correlated photon pairs using $\chi^{(3)}$ nonlinear optical process. More specifically, the present disclosure relates to an optical ring resonator for generating quantum-correlated photon pairs over the telecommunication wavelength band. Recent advances in quantum photonics have resulted in broad applications, such as secure quantum communication, metrology, sensing, and advanced computing. For example, by encoding information in the quantum states of single photons, laws of quantum mechanics ensure that a quantum state cannot be copied or tampered without being measured and then destroyed, increasing the security of the encoded information. Many quantum cryptography protocols, in the form of quantum key distribution (QKD), have been developed utilizing single photons over channels for quantum communication. Thus, single photon sources are one of the key building blocks for quantum photonic technologies. Moreover, future development of quantum communication requires teleporting quantum states over long distances via quantum repeaters, and storing quantum information locally over a significant time period. Both require single photons to have high quantum state purity and long coherent time. In addition, recent advances in integrated quantum photonics show great promise for quantum information processing on chip. However, due to the lack of an efficient chip-scale single photon source, current quantum photonic circuits have to rely on external sources for proper operation. Thus, a versatile integrated single photon source is desirable for both long-haul quantum communication and integrated quantum information processing and computing.

One current technique for single photon generation is a single photon emitter, which generates single photon emission from a single atom, quantum dot, color center, or the like, and is able to produce single photons on demand. However, single photon emitters are generally vulnerable to environment-induced decoherence and may require cryogenic cooling, making them challenging for practical implementation. Another current technique for single photon generation is generating heralded single photons from correlated photon pairs through nonlinear optical processes, such as spontaneous parametric down conversion (SPDC) and spontaneous four-wave mixing (SFWM). Quantum-correlated photon pairs may be used to generate entangled photon pairs. The correlated physical properties of the entangled photon pairs may include linear polarization, circular polarization, spin, translational momentum, and orbital angular momentum. Measurement of at least one of the quantum-correlated properties of one of the entangled photons provides the measurer (i.e., an observer) with information regarding the same quantum-correlated property of the other photon of the entangled photon pair. Without intending to be limited by theory, a nonlinear optical process is an optical process involving a nonlinear response to a driving light field, such as one or more propagating photons. Although photon emission by nonlinear optical processes has a probabilistic nature, the simplicity, flexibility, and room temperature operation of nonlinear optic processes make them attractive for practical quantum applications.

In SPDC, various inorganic crystals with $\chi^{(2)}$ optical nonlinearity are used as bulk crystal sources, for example, potassium dideuterium phosphate, beta barium borate, and lithium niobate. One disadvantage of SPDC bulk crystal sources is that they emit photon pairs into a multimode spatial profile, resulting in low photon generation/collection efficiency coupled to single mode fibers. Further, SPDC processes have phase-matching constraints that hinder and/or prevent photon emission for some wavelengths of interest, such as wavelengths in the telecommunication wavelength band. Moreover, quantum correlated photon pairs generated using SPDC generally exhibit a non-factorable spectrum which degrades the quantum-state purity of the generated quantum-correlated photon pairs.

SFWM is a process with $\chi^{(3)}$ optical nonlinearity, and is the dominant nonlinear process in centro-symmetric materials that do not have $\chi^{(2)}$ nonlinearity. Although $\chi^{(3)}$ nonlinear process is generally much weaker than $\chi^{(2)}$ nonlinear process, flexible dispersion engineering in $\chi^{(3)}$ nonlinear materials makes phase matching easier to realize than in $\chi^{(2)}$ nonlinear processes, such as SPDC. SFWM-based photon pair sources have been demonstrated in various structures, such as fibers, waveguides, and micro-cavities, and on various material platforms such as glass, silicon, and silicon nitride, which are favorable materials for modern semiconductor technology. In particular, cavity-assisted SFWM-based sources can enhance the efficiency of photon pair generation and thus realize high spectral brightness comparable to the SPDC-based sources. Thus, increasingly efficient and effective sources of quantum-correlated photon pairs that use the SFWM process are desired.

SUMMARY

According to the subject matter of the present disclosure, an optical ring resonator includes a closed loop core, a cladding layer, and one or more bus waveguides. The closed loop core is disposed in the cladding layer and is $As_2Se_3$ glass. The one or more bus waveguides are disposed in the cladding layer adjacent to the closed loop core such that the one or more bus waveguides are optically coupled to the closed loop core. The closed loop core has a zero-dispersion wavelength within a telecommunication wavelength band. The closed loop core has a plurality of resonant modes, including a zero-dispersion resonant mode corresponding with the zero-dispersion wavelength and a plurality of paired resonant modes. The closed loop core has a phase matching bandwidth extending greater than ±40 nm from the zero-dispersion wavelength. Moreover, upon receipt of a plurality of pump photons having a pump wavelength, which is the zero-dispersion wavelength, the closed loop core is structurally configured to generate one or more quantum correlated photon pairs by a spontaneous four-wave mixing process at paired resonant modes corresponding with wavelengths within the phase matching bandwidth.

In accordance with one embodiment of the present disclosure, a method of generating one or more quantum correlated photon pairs includes directing a plurality of pump photons having a pump wavelength and generated using an optical pump into an input end of at least one of one or more bus waveguides of an optical ring resonator. The one or more bus waveguides are disposed within a cladding layer of the optical ring resonator, adjacent and optically coupled to a closed loop core, such that the plurality of pump photons propagate from the at least one bus waveguide into the closed loop core and propagate within the closed loop core, thereby generating one or more quantum correlated photon pairs by a spontaneous four-wave mixing process. Further, the closed loop core includes $As_2Se_3$ glass, a zero-dispersion wavelength within a telecommunication wavelength band, where the pump wavelength of the plurality of pump photons is the zero-dispersion wavelength, a plurality of resonant modes including a zero-dispersion resonant mode corresponding with the zero-dispersion wavelength and a plurality of paired resonant modes, and a phase matching bandwidth extending greater than ±40 nm from the zero-dispersion wavelength. Moreover, the one or more quantum correlated photon pairs are generated by the-four wave mixing process at paired resonant modes corresponding with wavelengths within the phase matching bandwidth.

In accordance with another embodiment of the present disclosure, a method of manufacturing an optical ring resonator includes depositing an $As_2Se_3$ film on a first material layer, where the first material layer is disposed on a substrate layer, depositing a patterned resist layer having a closed loop pattern on the $As_2Se_3$ film, etching an exposed portion of the $As_2Se_3$ film, thereby retaining a patterned $As_2Se_3$ film on the first material layer, the patterned $As_2Se_3$ film having the closed loop pattern of the patterned resist layer, removing the patterned resist layer, and depositing a second material layer on the first material layer and the patterned $As_2Se_3$ film, such that the first material layer and the second material layer collectively form a cladding layer and the patterned $As_2Se_3$ film with the closed loop pattern is disposed within the cladding layer, thereby forming a closed loop core.

Although the concepts of the present disclosure are described herein with primary reference to apparatuses and systems for generating quantum correlated photon pairs using nonlinear optical processes, it is contemplated that the concepts will enjoy applicability to any quantum information communication.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Reference will now be made in detail to embodiments of an optical ring resonator that may be implemented as part of a quantum-correlated photon-pair generator that is operable as a chip-scale photon source configured to efficiently produce quantum-correlated photon pairs by the SFWM process. The optical ring resonator includes a closed loop core that comprises arsenic selenide ($As_2Se_3$) glass disposed in a cladding layer. Arsenic selenide is a chalcogenide material and has broad infrared transparency resulting in low linear and nonlinear optical losses in the telecommunication wavelength band. The $As_2Se_3$-based ring resonator offers a number of advantages when generating quantum-correlated photon pairs, such as a large phase matching bandwidth, a high photon pair emission rate, a high photon pair generation efficiency, low Raman gain (i.e., noise), and flexible design capabilities. As used herein, "telecommunication wavelength band," refers to a wavelength band from 1260 nm to 1625 nm, which is the typical wavelength region for fiber-optic communications, as optical fibers have low transmission loss in this region. Further, the telecommunication wavelength band may be subdivided into five sub-bands: from 1260 nm to 1360 nm (the original band or "O-band"), from 1360 nm to 1460 nm (the extended ban or "E-band"), from 1460 nm to 1530 nm (the short band or "S-band"), from 1530 nm to 1565 nm (the conventional band or "C-band"), and from 1565 nm to 1625 nm (the long band or "L-band").

Figure 1:
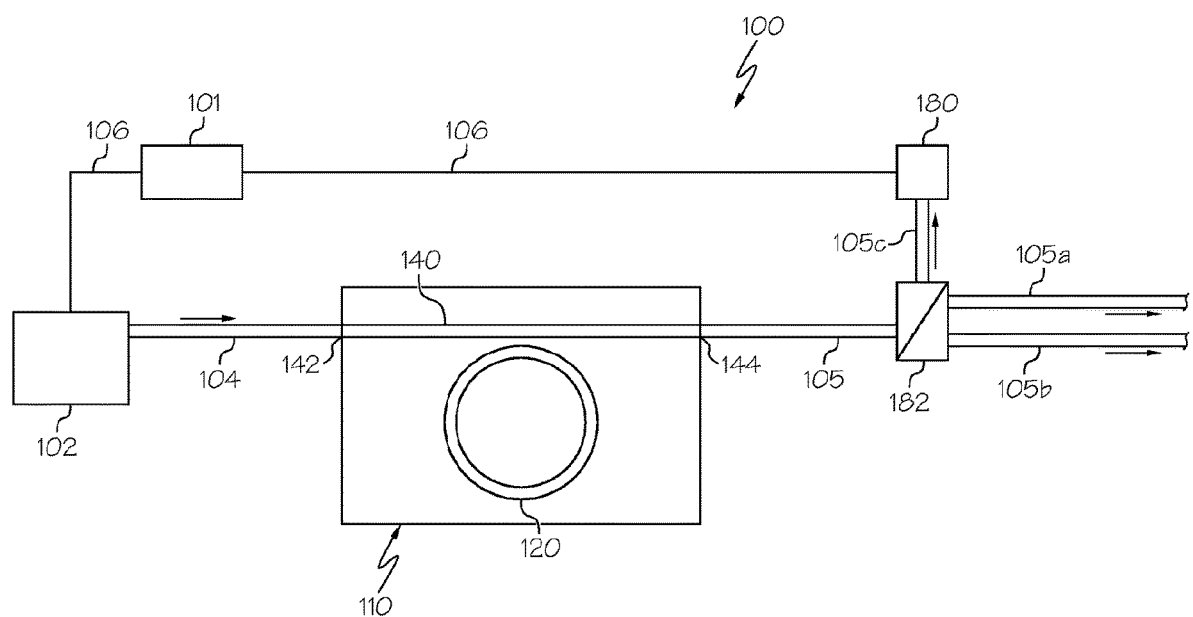
FIG. 1 schematically depicts an entangled photon generator comprising an optical pump, an optical ring resonator, and a photon detector, according to one or more embodiments shown and described herein.

Referring now to FIG. 1, a quantum-correlated photon pair generator 100 comprising an optical ring resonator 110 and an optical pump 102 is schematically depicted. The optical pump 102 is optically coupled to an input end 142 of at least one of one or more bus waveguides 140 of the optical ring resonator 110, for example, using one or more input optical pathways 104. The optical pump 102 comprises a laser source and is structurally configured to generate and output a plurality of pump photons, which may form a plurality of quantum correlated photon pairs by four wave mixing in the optical ring resonator 110. The quantum-correlated photon pair generator 100 may further comprise additional optical elements, such as one or more optical filters 182, and one or more multiplexers, each optically coupled to the optical ring resonator 110. In particular, these additional optical elements may be optically coupled to an output end 144 of at least one of the one or more bus waveguides 140 of the optical ring resonator 110, for example, using one or more output optical pathways 105. In some embodiments, the one or more input optical pathways 104 and the one or more output optical pathways 105 may comprise free space, free space in combination with collection optics such as lenses or the like, and/or waveguides, such as planar waveguides, optical fibers, or the like.

Figure 2A:
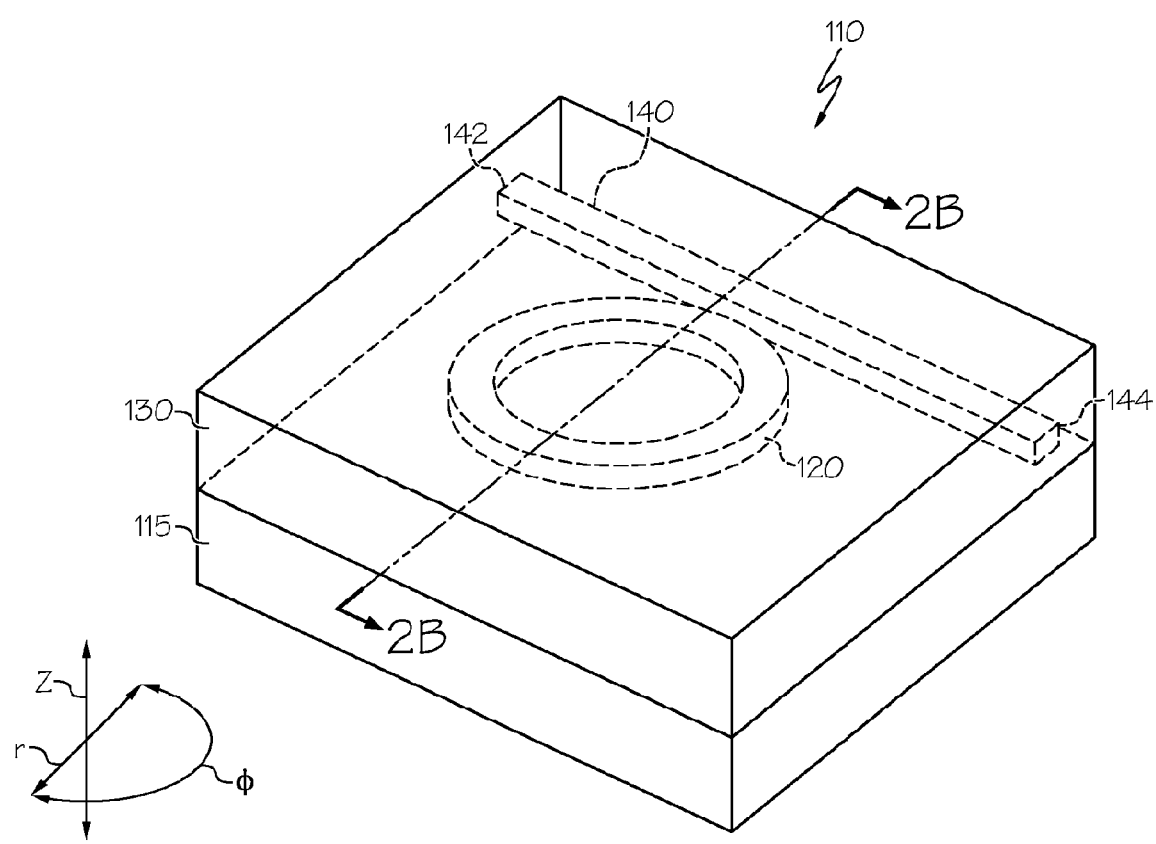
FIG. 2A schematically depicts an optical ring resonator including a closed loop core, a cladding layer, and a substrate layer, according to one or more embodiments shown and described herein.
Figure 2B:
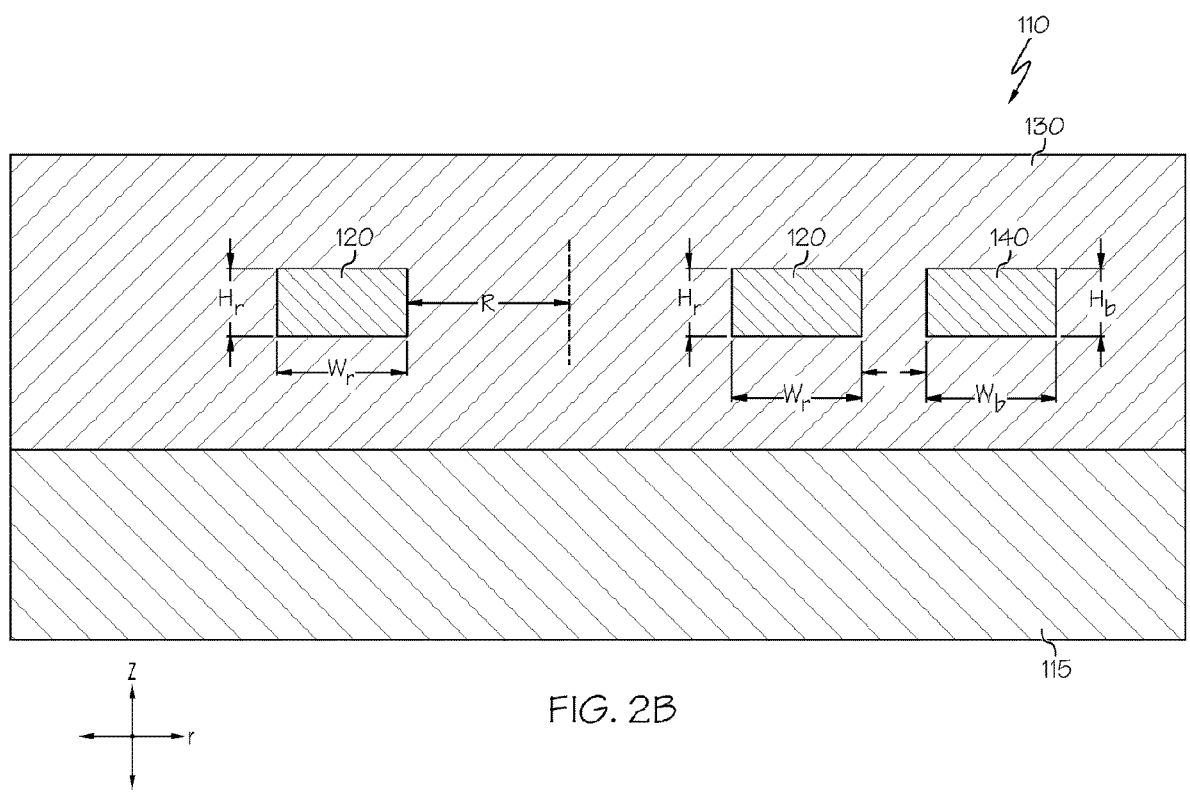
FIG. 2B schematically depicts a cross-section of the optical ring resonator, according to one or more embodiments shown and described herein.

Referring now to FIGS. 2A and 2B, the optical ring resonator 110 comprises a closed loop core 120, a cladding layer 130, one or more bus waveguides 140, and a substrate layer 115. FIG. 2A is a schematic perspective view of the optical ring resonator 110 and FIG. 2B is a sectional view of the optical ring resonator 110 of FIG. 2A taken along line 2B-2B. As shown in FIGS. 2A and 2B, the closed loop core 120 and the one or more bus waveguides 140 are disposed in the cladding layer 130 and the cladding layer 130 is disposed on the substrate layer 115. At least one of the one or more bus waveguides 140 comprises an input end 142 and at least one of the one or more bus waveguides 140 comprises an output end 144. In operation, the input end 142 of at least one of the one or more bus waveguides 140 may receive pump photons and the output end 144 of at least one of the one or more bus waveguides 140 may output quantum-correlated photon pairs, as well as pump photons that fail to undergo SFWM.

Referring still to FIGS. 2A and 2B, the one or more bus waveguides 140 are disposed in the cladding layer 130 adjacent the closed loop core 120, such that the one or more bus waveguides 140 are optically coupled to the closed loop core 120, for example, by evanescent coupling. To facilitate optical coupling, a spacing distance (SD) between a portion of each of the one or more bus waveguides 140 located nearest the closed loop core 120 and the closed loop core 120 is 200 nm or less, for example from about 1 nm to about 200 nm, from about 10 nm to about 150 nm, from about 25 nm to about 100 nm, or the like, such as 175 nm, 150 nm, 125 nm, 100 nm, 90 nm, 80 nm, 70 nm, 60 nm, 50 nm, 40 nm, 30 nm, 25 nm, 20 nm, 15 nm, 10 nm, 5 nm, 2 nm, 1 nm, 0.5 nm, or the like.

Because the one or more bus waveguides 140 are optically coupled to the closed loop core 120, the one or more bus waveguides 140 provide optical pathways for photons to enter and exit the closed loop core 120, for example, for pump photons to enter the closed loop core 120, and for quantum-correlated photon pairs to exit the closed loop core 120. Further, while a single bus waveguide (e.g., a first bus waveguide) comprising both the input end 142 and the output end 144 is depicted in FIGS. 1-2B, it should be understood that multiple bus waveguides are contemplated. For example, in some embodiments, the one or more bus waveguides 140 comprise a first bus waveguide and a second bus waveguide, each optically coupled to the closed loop core 120, for example, positioned on opposite sides of the closed loop core 120. In this example embodiment, the first bus waveguide comprises an input end 142 configured to receive pump photons and the second bus waveguide comprises an output end 144 configured to output quantum correlated photon pairs. In particular, pump photons may be directed into the input end 142 of the first bus waveguide and quantum-correlated photon pairs generated in the closed loop core 120 may propagate from the closed loop core 120 into the second bus waveguide, thereafter exiting the output end of the second bus waveguide. Further, it should be understood that in this example embodiment, both the first bus waveguide and the second bus waveguide may comprise an input end 142 and an output end 144.

Referring still to FIGS. 2A and 2B, the closed loop core 120 comprises $As_2Se_3$ glass. As used herein, "$As_2Se_3$ glass" refers to a glass having from 0.1 wt. % to 10 wt. % $As_2Se_3$. In some embodiments, the $As_2Se_3$ glass further comprises 45 wt. % silicon dioxide ($SiO_2$) or greater, for example, from 45 wt. % to 85 wt. % $SiO_2$, from 55 wt. % to 75 wt. % $SiO_2$, or the like. In addition, the $As_2Se_3$ glass may further comprise up to 10 wt. % PbSe and up to 10% $GeSe_2$. $As_2Se_3$ glass comprises a high refractive index, for example, from about 2.7 to about 2.9, such as 2.84 around the telecommunication wavelength band. The cladding layer 130 may comprise any transparent material having a refractive index that is less than the closed loop core 120 and the one or more bus waveguides 140. In some embodiments, the cladding layer 130 may comprise a material having a refractive index that is much lower than the refractive index of the closed loop core 120, for example, $SiO_2$ with a refractive index of around 1.44. Increasing the refractive index contrast between the closed loop core 120 and the cladding layer 130 increases light confinement in the closed loop core 120 and allows the closed loop core 120 to have a small radius R with small optical bending loss, resulting in a compact device footprint. For example, the closed loop core 120 may comprise a radius R of less than 100 μm, for example, less than 50 μm, less than 25 μm, less than 15 μm, less than 10 μm, less than 7.5 μm, less than 5 μm, or the like. For example, the closed loop core 120 may comprise a radius R of from about 2 μm to about 20 μm, from about 2 μm to about 15 μm, from about 2 μm to about 10 μm, or the like, such as 2 μm, 4 μm, 5 μm, 6 μm, 8 μm, 10 μm, 12 μm, 15 μm, 20 μm, 25 μm, or the like. Furthermore, as shown in FIGS. 2A and 2B, the closed loop core 120 may comprise a rectangular cross section with width $W_r$ and height $H_r$. For example, the closed loop core 120 may comprise a height $H_r$ of from about 100 nm to about 2 μm, a width $W_r$ of from about 100 nm to about 2 μm, and a cross sectional area of from about 0.1 µm to about 2 µm, for example, about 2 µm or less, about 1.5 µm or less, about 1 µm or less, about 0.75 µm or less, about 0.5 µm or less, about 0.25 µm or less, about 0.2 µm or less about 0.1 µm or less, or the like.

In some embodiments, the one or more bus waveguides 140 may comprise $As_2Se_3$ glass. However, it should be understood that the one or more bus waveguides 140 may comprise any transparent material that comprises a higher refractive index than the cladding layer 130 while facilitating optical coupling with the closed loop core 120. In addition, the substrate layer 115 may comprise any suitable transparent material, for example, silicon. As shown in FIGS. 2A and 2B, each of the one or more bus waveguides 140 may comprise a rectangular cross section with width $W_b$ and height $H_b$. For example, the one or more bus waveguides 140 may comprise a height $H_b$ of from about 100 nm to about 2 µm, a width $W_b$ of from about 100 nm to about 2 µm, and a cross sectional area of from about 0.1 µm to about 2 µm, for example, about 2 µm or less, about 1.5 µm or less, about 1 µm or less, about 0.75 µm or less, about 0.5 µm or less, about 0.25 µm or less, about 0.2 µm or less about 0.1 µm or less, or the like.

Referring still to FIGS. 2A and 2B, the closed loop core 120 is a ring resonator that supports a plurality of resonant modes 200 (FIG. 3), which include a zero-dispersion resonant mode 210 (which may be referred to as a pump resonant mode) a plurality of lower wavelength resonant modes 222 and higher wavelength resonant mode 224. In particular, the closed loop core 120 is an azimuthally symmetric resonator and each resonant mode 200 of the closed loop core 120 exhibits a unique angular momentum with a field distribution $\vec{E_m}(r, z, \omega_m) \propto \vec{E_m}(r, z)e^{im\phi}$, where m is an integer angular-momentum wavenumber denoting the mode number, r, z, and φ are coordinates in the cylindrical coordinates (r is the radial distance and φ is the azimuthal angle), and $\omega_m$ is the optical resonance angular frequency, which is related to the optical wavelength $\lambda_m$ as $\omega_m=2\pi c/\lambda_m$, where c is the speed of light in vacuum. When optical loss is present, the resonant mode exhibits finite linewidth δω, which is the full width at half-maximum bandwidth of the optical resonance. Optical quality factor (Q), which is defined as the ratio of the resonance frequency to the linewidth, may be used to characterize the optical loss in an optical resonator, such as the optical ring resonator 110. A high Q indicates low optical loss and thus a long photon storage time inside the optical resonator (e.g., the optical ring resonator 110). Furthermore, adjacent resonant modes of the plurality of resonant modes 200 are separated in spectrum by a mode spacing distance, which is also called free spectral range (FSR) and may be inversely proportional to the radius of the closed loop core 120 of the optical ring resonator 110. The FSR between each adjacent resonant mode of the plurality of resonant modes 200 can be ranged from 1 nm to about 40 nm, or even less than 1 nm, which can be modified by adjusting the radius R of the closed loop core 120.

Figure 3:
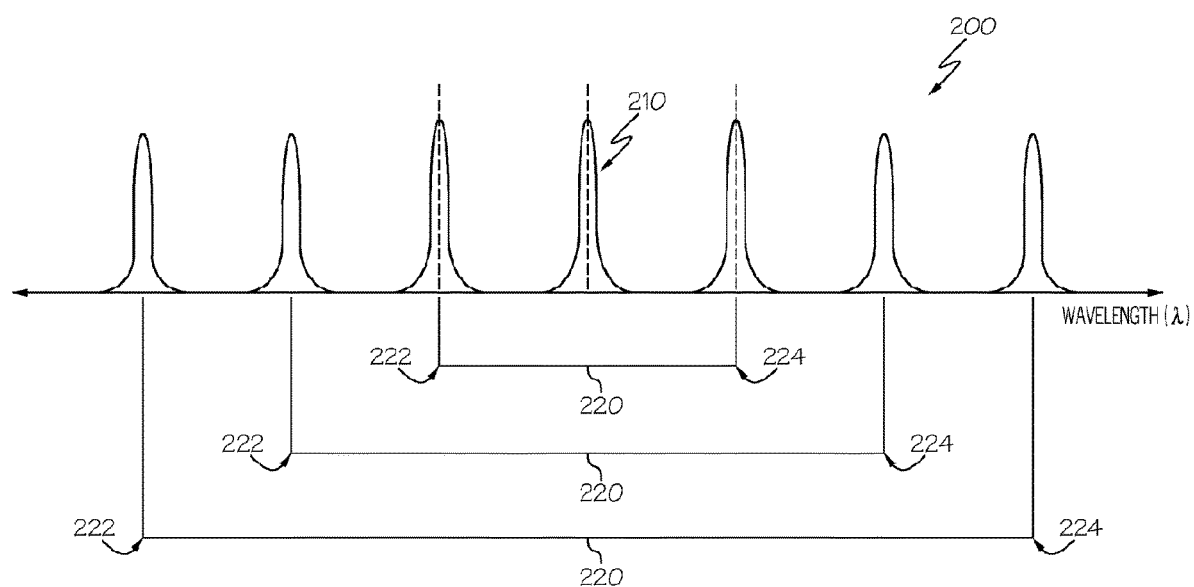
FIG. 3 graphically depicts a plurality of resonant modes of a closed loop core, according to one or more embodiments shown and described herein.

Referring now to FIGS. 1-3, generation of quantum-correlated photon pairs in the optical ring resonator 110 will now be described. In operation, the optical pump 102 may generate a plurality of pump photons (which comprise a pump wavelength) that are co-polarized with one another, that is, individual photons of the plurality of pump photons comprise the same polarization. The plurality of pump photons are directed into the input end 142 of at least one of the one or more bus waveguides 140, for example, by the input optical pathway 104, such that the plurality of pump photons couple from the at least one of the one or more bus waveguides 140 into the closed loop core 120 and excite a zero-dispersion resonant mode 210 at a pump wavelength $\lambda_p$ and pump frequency $\omega_p$. To excite the zero-dispersion resonant mode 210, the pump wavelength $\lambda_p$ is the zero-dispersion wavelength. The plurality of pump photons then propagate in the closed loop core 120, which comprises $As_2Se_3$ glass with strong third-order nonlinear susceptibility $\chi^{(3)}$, and the SFWM process may occur in which two pump photons are annihilated to generate a signal photon with wavelength $\lambda_s>\lambda_p$ (frequency $\omega_s<\omega_p$) at a higher wavelength resonant mode 224 and an idler photon with wavelength $\lambda_i<\lambda_p$ (frequency $\omega_i>\omega_p$) at a lower wavelength resonant mode 222. The pair of signal photon and idler photon comprises a quantum-correlated photon pair generated at paired resonant modes 220.

For efficient generation of quantum-correlated photon pairs, SFWM should conserve both energy and momentum. For the optical ring resonator 110, energy conservation requires $2\omega_p=\omega_s+\omega_i$, and angular momentum conservation requires $2m_p=m_s+m_i$, where $m_p$, $m_s$, $m_i$ are the mode numbers for the pump, signal and idler waves. When both energy and momentum are conserved, with $N_p$ number of pump photons propagating in the closed loop core 120, the probability of emitting a pair of signal and idler photons (i.e., a quantum-correlated photon pair) into the bus waveguide 140 at time $i_s$ and $t_i$ is given by the following equation (1):

$$p_c(t_s, t_i) = \frac{\Gamma_{es}\Gamma_{ei}}{\Gamma^2}(gN_p)^2 e^{-\Gamma_{tj}|t_s-t_i|},$$

where $\Gamma_{tj}=\Gamma_{ts}$ when $t_s>t_i$ and $\Gamma_{tj}=\Gamma_{ti}$ when $t_i>t_s$. $\Gamma_{ts}$ is the photon decay rate the signal photon, $\Gamma_{ti}$ is the photon decay rate of the idler photon, $\Gamma_{es}$ is the external coupling rate of the signal photon, and $\Gamma_{ei}$ is the external coupling rate of the idler photon. $\bar{\Gamma}$ is the averaged photon decay rate, where $\bar{\Gamma}=1/\bar{\tau}=(\Gamma_{ts}+\Gamma_{ti})/2$ and $\bar{\tau}$ is the averaged photon lifetime. Further, g is the vacuum coupling rate of the spontaneous four wave mixing process and $$g \cong \frac{\hbar c n_2 \omega_p \sqrt{\omega_s \omega_i}}{n^2 V},$$

where $\hbar$ is the reduced Planck's constant, c is the speed of light in the vacuum, n is the refractive index, $n_2$ is the Kerr nonlinear coefficient, V is the effective mode volume of the closed loop core 120. As indicated by the emission probability $p_c(t_s,t_i)$, the signal photons and idler photons that are generated in a time scale of the photon lifetime within which the photon pair (i.e., the signal and idler photons) remains highly correlated. In other words, a large photon lifetime leads to a large pair emission probability, where a photon-pair emission rate $R_c$ is given by the equation (2):

$$R_c = \frac{\Gamma_{es}\Gamma_{ei}}{\Gamma_{ts}\Gamma_{ti}} \frac{2(gN_p)^2}{\Gamma^2}.$$

A metric characterizing the photon-pair generation efficiency is called spectral brightness, which is defined as the photon-pair emission rate per unit spectral width per unit pump power square (since SFWM depends quadratically on the pump power). Thus, a photon pair source with the micro-ring resonator comprising a high optical Q, strong Kerr nonlinearity, and small effective mode volume would exhibit a large photon-pair emission rate. In some embodiments, the closed loop core 120 comprises a high optical Q in the range between $10^5$ and $10^7$. Without intending to be limited by theory, when the closed loop core 120 comprises a high optical Q, significant Purcell enchantment results in an enhancement of the spontaneous emission rate of quantum-correlated photon pairs in the closed loop core 120. Purcell enhancement increases the photon pair generation efficiency of the closed loop core 120 and facilitates the generation of quantum-correlated photon pairs at discrete frequencies (or wavelengths) with high state purity. Moreover, the closed loop core 120 comprising $As_2Se_3$ glass has a high Kerr $\chi^{(3)}$ nonlinearity coefficient $n_2$ of about $1.1\times10^{-17} m^2/W$ or greater. In addition, the small footprint of the $As_2Se_3$ closed loop core 120 results in an effective mode volume of $10^{16}$ $m^3$ or less. Therefore, the quantum-correlated photon pair generator 100 that includes the $As_2Se_3$ closed loop core 120 may generate quantum-correlated photon pairs by SFWM exhibiting a photon pair generation efficiency (spectral brightness) in the order of $10^8$ to $10^{13}$ pairs/s/mW$^2$/GHz.

For practical implementation, momentum conservation can be guaranteed when the mode numbers of the signal and idler photons are chosen to be $m_s=m_p-\Delta m$ and $m_i=m_p+\Delta m$, where $\Delta m$ is an integer. However, the energy conservation is not easy to fulfill and thus requires engineering of the group velocity dispersion (GVD) for the optical ring resonator 110. Without intending to be limited by theory, "GVD" refers to the frequency dependence of the group velocity of photons propagating in a medium, such as the closed loop core 120. Herein, "zero-dispersion wavelength (ZDW)" is used to denote the wavelength at which the GVD value is zero. When the wavelength of the pump photons is located at the ZDW, the energy conservation $2\omega_p=\omega_s+\omega_i$ can be satisfied for $m_s=m_p-\Delta m$ and $m_i=m_p+\Delta m$. This circumstance may be referred to as the "phase-matching condition," in which $(2\omega_p-\omega_s-\omega_i=0)$, is satisfied. For the optical ring resonator 110, when the amplitude of the frequency mismatch $|2\omega_p-\omega_s-\omega_i|/2\pi$ is less than the linewidth $\delta\omega/2\pi$ of the resonant modes, the phase-matching is still moderately satisfied to ensure high efficiency of quantum-correlated photon pair generation. For an operation wavelength of 1550 nm, optical Q values may range from $10^5$ to $10^7$ resulting in the linewidth ranging from 19.4 MHz to 1.94 GHz. Therefore, with sufficient pump power, different quantum-correlated photon pairs can be generated at multiple paired resonant modes 220 simultaneously when $|2\omega_p-\omega_s-\omega_i|/2\pi<\delta\omega/2\pi$ is satisfied.

Furthermore, the spectral (or wavelength) range over which signal photons and idler photons (i.e., quantum-correlated photon pairs) are generated by SFWM is called phase-matching bandwidth. The closed loop core 120 comprising $As_2Se_3$ glass has a large phase-matching bandwidth such that quantum-correlated photon pairs may be generated over a broad wavelength range. The combination of a large phase-matching bandwidth and a small FSR between adjacent resonant modes of the plurality of resonant modes 200 allows for the generation of quantum-correlated photons over broad wavelength range. For example, the phase-matching bandwidth may comprise from about ±20 nm to about ±120 nm, from about ±30 nm to about ±100 nm, from about ±40 nm to about ±90 nm, or the like, such as ±20 nm, 25 nm, ±30 nm, 35 nm, ±40 nm, 45 nm, 50 nm, 55 nm, ±60 nm, 65 nm, ±70 nm, 75 nm, ±80 nm, 85 nm, ±90 nm, 95 nm, ±100 nm, 105 nm, ±110 nm, 115 nm, ±120 nm, or the like.

Figure 4A:
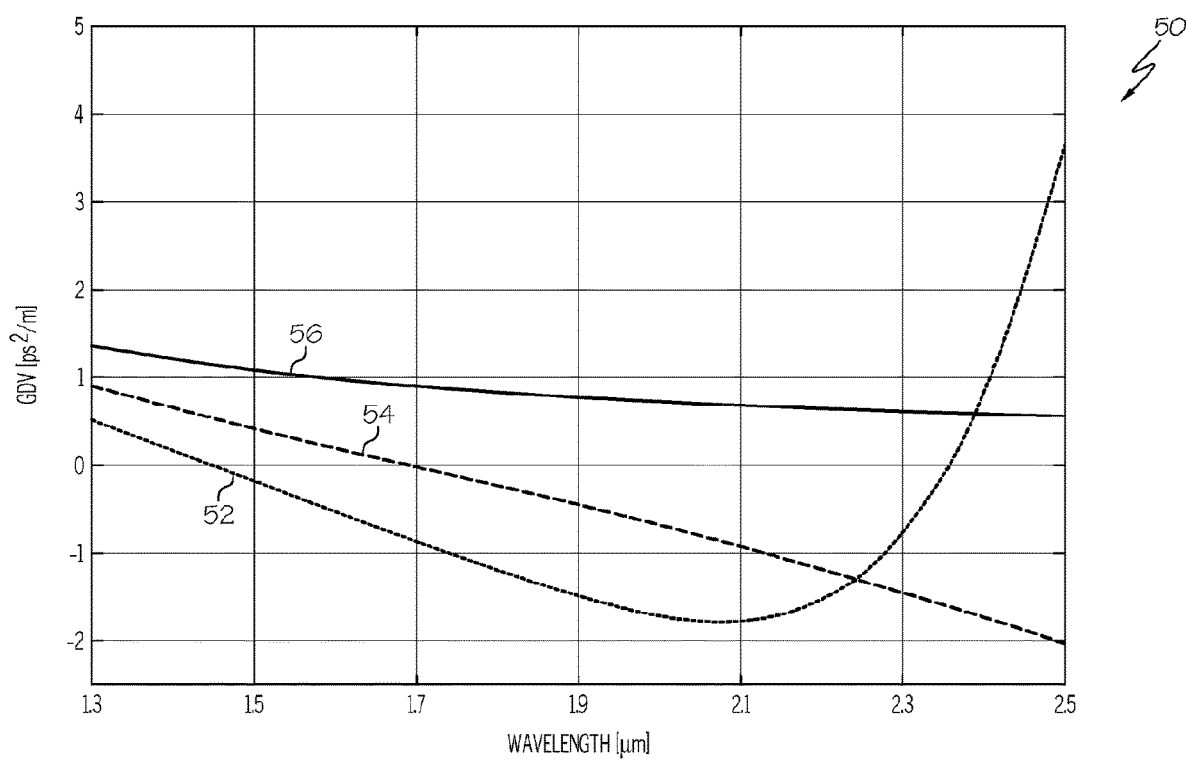
FIG. 4A graphically depicts group velocity dispersion of pump photons comprising a range of wavelengths propagating in different embodiments of a closed loop core, according to one or more embodiments shown and described herein.

FIG. 4A depicts a graph 50 showing the GVD of the fundamental quasi-transverse-electric (TE) mode for different embodiments of the closed loop core 120 comprising $As_2Se_3$ glass. Herein, the "TE mode" denotes the optical transverse mode with major electric field component along the horizontal axis. For example, line 52 of graph 50 shows the GVD of an example of the closed loop core 120 comprising a width of 800 nm and a height of 400 nm, line 54 shows the GVD of an example of the closed loop core 120 comprising a width of 1200 nm and a height of 600 nm, and line 56 shows the material dispersion of $As_2Se_3$. As shown in FIG. 3, the embodiment of the closed loop core 120 represented by line 52 comprises a ZDW at about 1.475 μm and the embodiment of the closed loop core represented by line 54 comprises a ZDW at about 1.7 μm. By adjusting the cross sectional area (i.e., width×height) of the closed loop core 120 down to sub-micron sizes, the ZDW can be tailored in the telecommunication wavelength band. In some embodiments, the ZDW of the closed loop core 120 is in the C-band of the telecommunication wavelength band, for example from about 1545 nm to about 1555 nm, such as 1550 nm. Therefore, the generated quantum-correlated photon pairs are within the telecommunication wavelength band and can be used in telecommunication applications.

Figure 4B:
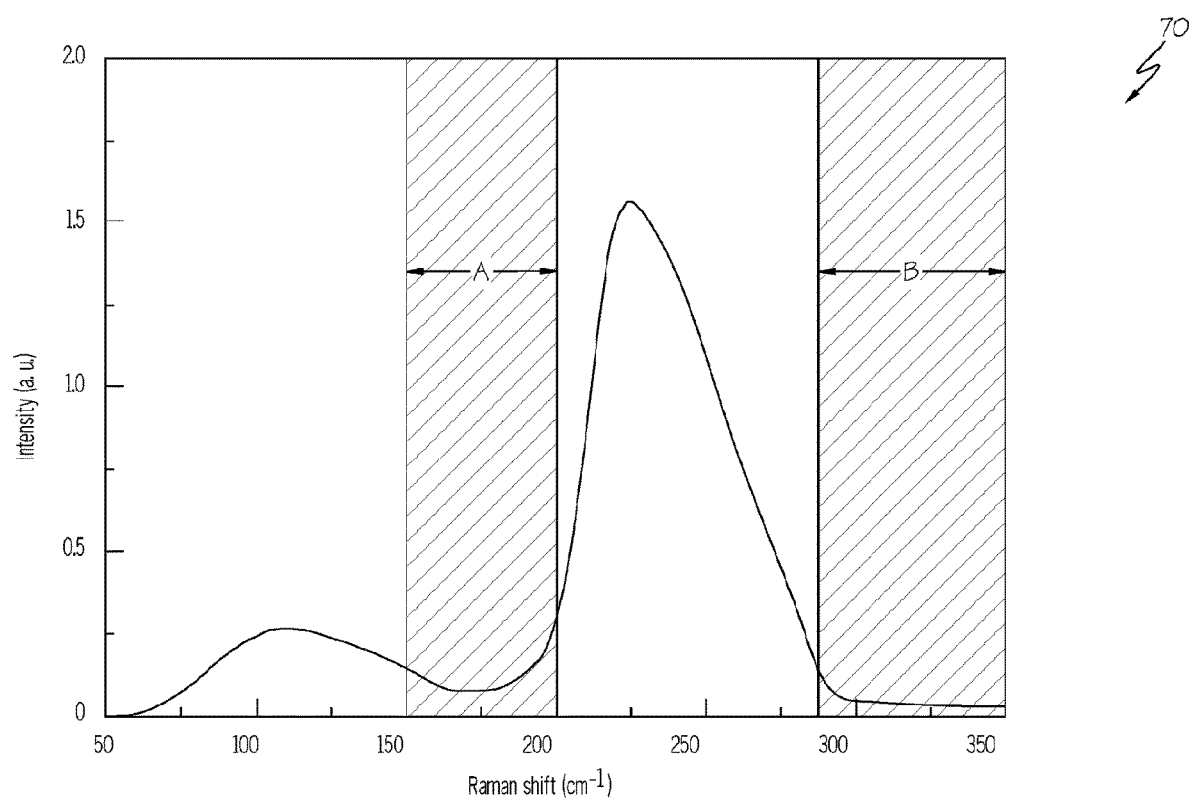
FIG. 4B graphically depicts the Raman noise spectrum of the closed loop core of FIGS. 1-2B, according to one or more embodiments shown and described herein.

Moreover, the closed loop core 120 comprising $As_2Se_3$ has a narrow Raman noise spectrum, as depicted in FIG. 4B. In particular, FIG. 4B depicts a graph 70 showing the Raman noise spectrum of $As_2Se_3$ (e.g., of the closed loop core 120 comprising $As_2Se_3$). As used herein, "Raman noise spectrum" refers to as the wavelength range extending from the optical pump wavelength over which Raman scattering (or Raman noise) occurs in a medium. Without intending to be limited by theory, Raman scattering (or Raman noise) is the inelastic scattering of a photon by molecules (for example, the molecules of the closed loop core 120 or other waveguides) which are excited to higher vibrational or rotational energy levels. Raman scattering can cause photon noise that interferes with the generation of quantum-correlated photon pairs and can degrade signal quality when the quantum-correlated photon pairs measured and/or otherwise used in a quantum communication system. In other words, Raman noise can cause the quantum-correlated photon pairs to have poor purity and fidelity.

However, as shown in FIG. 4B, the Raman noise spectrum of $As_2Se_3$ includes spectral windows of low Raman gain, indicated in FIG. 4B as spectral window A and spectral window B. As used herein, a "spectral window of low Raman gain" is a wavelength range in which the ratio of the photon generation rate by spontaneous four-wave mixing to the photon generation rate by Raman scattering is larger than 5. The closed loop core 120 comprising $As_2Se_3$ glass is able to generate quantum-correlated photon pairs in the spectral windows of low Raman gain to mitigate the detrimental effects of Raman noise by the combination of a narrow Raman noise spectrum and a large phase-matching bandwidth. In some embodiments, the phase-matching bandwidth of the closed loop core 120 is large enough to extend into a spectral window of low Rama gain (or multiple spectral windows of low Raman gain such that quantum-correlated photon pairs can be generated within the spectral windows of low Raman gain. For example, as depicted in FIG. 4B, the closed loop core 120 can generate quantum-correlated photon pairs in the spectral window A (Raman shift from about 152 to 190 $cm^{-1}$) or in the spectral window B (Raman shift larger than about 288 $cm^{-1}$), or in both.

Referring again to FIG. 1, the quantum-correlated photon pairs and any pump photons that do not undergo four wave mixing exit the output end 144 of the one or more bus waveguides 140 and propagate along the optical output pathway 105. Further, in the example embodiment of the quantum-correlated photon pair generator 100 depicted in FIG. 1, the quantum-correlated photon pairs and any pump photons that do not undergo four wave mixing are directed to the optical filter 182, which is configured to filter and suppress the residue pump photons and direct each of the signal photons into a first quantum pair pathway 105a and may direct the idler photons into a second quantum pair pathway 105b. The divided signal and idler photons may be directed to single photon detectors for quantum measurement and/or used for various quantum photonic applications, such as quantum communications. For example, the optical filter 182 may direct each of the signal photons into a first quantum pair pathway 105a and may direct the idler photons into a second quantum pair pathway 105b. In addition, the pump photons filtered by the optical filter 182 may be directed to a photon detector 180 using a detector pathway 105c, which may provide feedback to a pump controller 101, for example, using one or more communication pathways 106. Then the pump controller 101 (or another computing device) could actively control the optical pump 102 to determine the performance of the optical ring resonator 110 based photon-pair source, such as the photon-pair emission rate $R_c$ and photon pair generation efficiency.

Figure 5A:
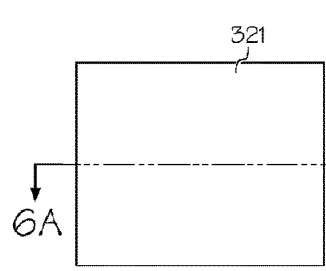
FIG. 5A schematically depicts a top view of a first step of manufacturing an optical ring resonator, according to one or more embodiments shown and described herein.

Referring now to FIGS. 5A-6F, a method of manufacturing the optical ring resonator 110 described herein is schematically depicted. In particular, FIGS. 5A-5F depict the method steps for manufacturing the optical ring resonator 110 from a top view and FIGS. 6A-6F depict cross sections of each of FIGS. 5A-5F. As shown in FIGS. 5A and 6A, the method first comprises disposing a first material layer 321 on a substrate layer 315, for example, by thermally growing the first material layer 321 on the substrate layer 315. The substrate layer 315 may comprise a silicon wafer or any other semiconductor substrate and as described below, the substrate layer 315 forms the substrate layer 115 of the optical ring resonator 110. In some embodiments, the first material layer 321 comprises $SiO_2$ and as described below, the first material layer 321 forms a portion of the cladding layer 130 of the resultant optical ring resonator 110 and thus, the first material layer 321 may comprise any material useable as the cladding layer 130.

Figure 5B:
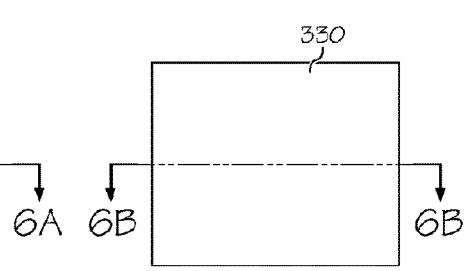
FIG. 5B schematically depicts a top view of a second step of manufacturing an optical ring resonator, according to one or more embodiments shown and described herein.
Figure 5C:
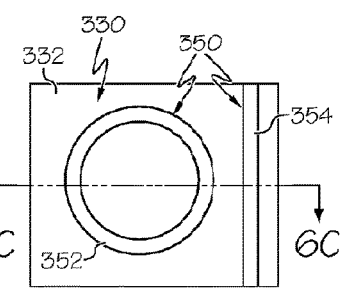
FIG. 5C schematically depicts a top view of a third step of manufacturing an optical ring resonator, according to one or more embodiments shown and described herein.
Figure 5F:
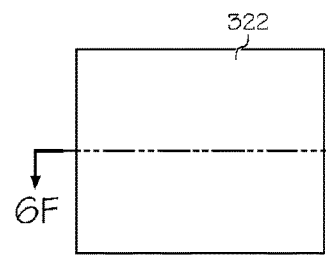
FIG. 5F schematically depicts a top view of a sixth step of manufacturing an optical ring resonator, according to one or more embodiments shown and described herein.
Figure 5D:
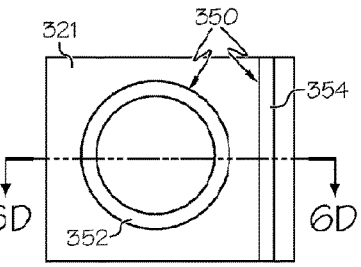
FIG. 5D schematically depicts a top view of a fourth step of manufacturing an optical ring resonator, according to one or more embodiments shown and described herein.
Figure 6A:
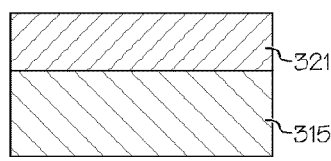
FIG. 6A is a cross-sectional view of FIG. 5A, along line 6A-6A, according to one or more embodiments shown and described herein.
Figure 6B:
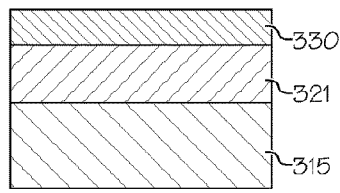
FIG. 6B is a cross-sectional view of FIG. 5B, along line 6B-6B, according to one or more embodiments shown and described herein.
Figure 6C:
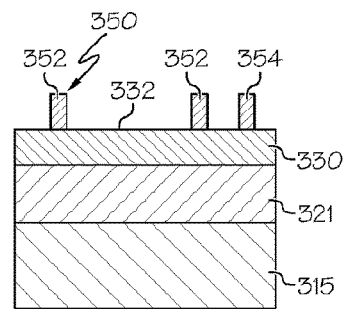
FIG. 6C is a cross-sectional view of FIG. 5C, along line 6C-6C, according to one or more embodiments shown and described herein.
Figure 6F:
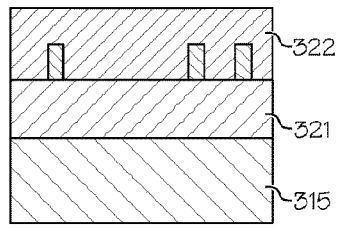
FIG. 6F is a cross-sectional view of FIG. 5F, along line 6F-6F, according to one or more embodiments shown and described herein.

Referring now to FIGS. 5B and 6B, the method next comprises depositing an $As_2Se_3$ film 330 on the first material layer 321, for example, by pulsed laser deposition or thermal evaporation. The $As_2Se_3$ film 330 is a film of $As_2Se_3$ glass as defined herein. Next, as shown in FIGS. 5C and 6C, the method comprises depositing a resist by spin coating and forming a patterned resist layer 350 comprising a closed loop pattern 352 on the $As_2Se_3$ film 330, for example, by photo-lithography or electron beam (e-beam) lithography. The patterned resist layer 350 may comprise a photo-resist layer for photo-lithography or an e-beam resist layer for e-beam lithography. In some embodiments, as depicted in FIGS. 5C and 6C, the patterned resist layer 350 further comprises one or more linear patterns 354 disposed adjacent to the closed loop pattern 352. Next, as depicted in FIGS. 5D and 6D, the method comprises etching the $As_2Se_3$ film 330 using the patterned resist layer 350 as an etching mask. As depicted in FIGS. 5D and 6D, etching $As_2Se_3$ film 330 removes the exposed portion 332 of the $As_2Se_3$ film 330 and retains the portion of the $As_2Se_3$ film 330 covered by the patterned resist layer 350, thereby forming a patterned $As_2Se_3$ film 332. After etching, the portion of the $As_2Se_3$ film 330 retained on the first material layer 321 comprises a portion shaped like the closed loop pattern 352 of the patterned resist layer 350 and a portion shaped like the one or more linear patterns 354 of the patterned resist layer 350. Thus, the patterned $As_2Se_3$ film 332 disposed on the first material layer 321 comprises a closed loop portion 334 and one or more linear portions 336.

Figure 5E:
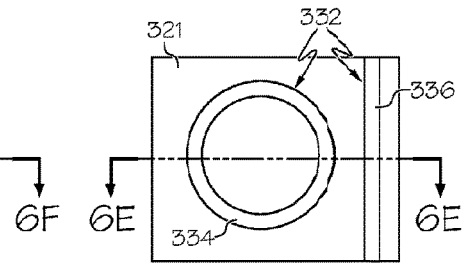
FIG. 5E schematically depicts a top view of a fifth step of manufacturing an optical ring resonator, according to one or more embodiments shown and described herein.
Figure 6E:
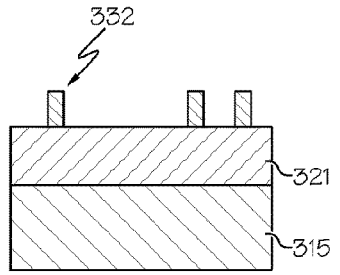
FIG. 6E is a cross-sectional view of FIG. 5E, along line 6E-6E, according to one or more embodiments shown and described herein.
Figure 6D:
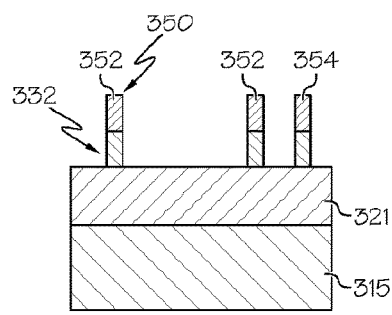
FIG. 6D is a cross-sectional view of FIG. 5D, along line 6D-6D, according to one or more embodiments shown and described herein.

Next, as depicted in FIGS. 5E and 6E, the method comprises removing the patterned resist layer 350 form the $As_2Se_3$ closed loop core 120. Referring now to FIGS. 5F and 6F, once the patterned resist layer 350 is removed, the method next comprises depositing a second material layer 322 on both the patterned $As_2Se_3$ film 332 and the first material layer 321, for example, using plasma-enhanced chemical vapor deposition, such that the first material layer 321 and the second material layer 322 collectively form a cladding layer (i.e., the cladding layer 130). By depositing the second material layer 322 on both the patterned $As_2Se_3$ film 332 and the first material layer 321, the closed loop portion 334 of the patterned $As_2Se_3$ film 332 is disposed within the cladding layer, thereby forming a closed loop core (i.e., the closed loop core 120) and the one or more linear portions 336 of the patterned $As_2Se_3$ film 332 are disposed within the cladding layer, thereby forming one or more bus waveguides (i.e., the one or more bus waveguides 140) positioned adjacent the closed loop core.

Referring again to FIGS. 5A-6F, in some embodiments, the closed loop pattern 352 comprises a radius of less than 100 μm such that the closed loop core comprises a radius of less than 100 μm and in some embodiments, the closed loop pattern 352 comprises a radius of less than 10 μm such that the closed loop core comprises a radius of less than 10 μm. Further, in some embodiments, a maximum spacing distance between a portion of each of the one or more linear patterns 354 located nearest the closed loop pattern 352 and the closed loop pattern 352 is 200 nm or less such that a maximum spacing distance between a portion of each of the one or more bus waveguides located nearest the closed loop core and the closed loop core is 200 nm or less.

EXAMPLES

Figure 7:
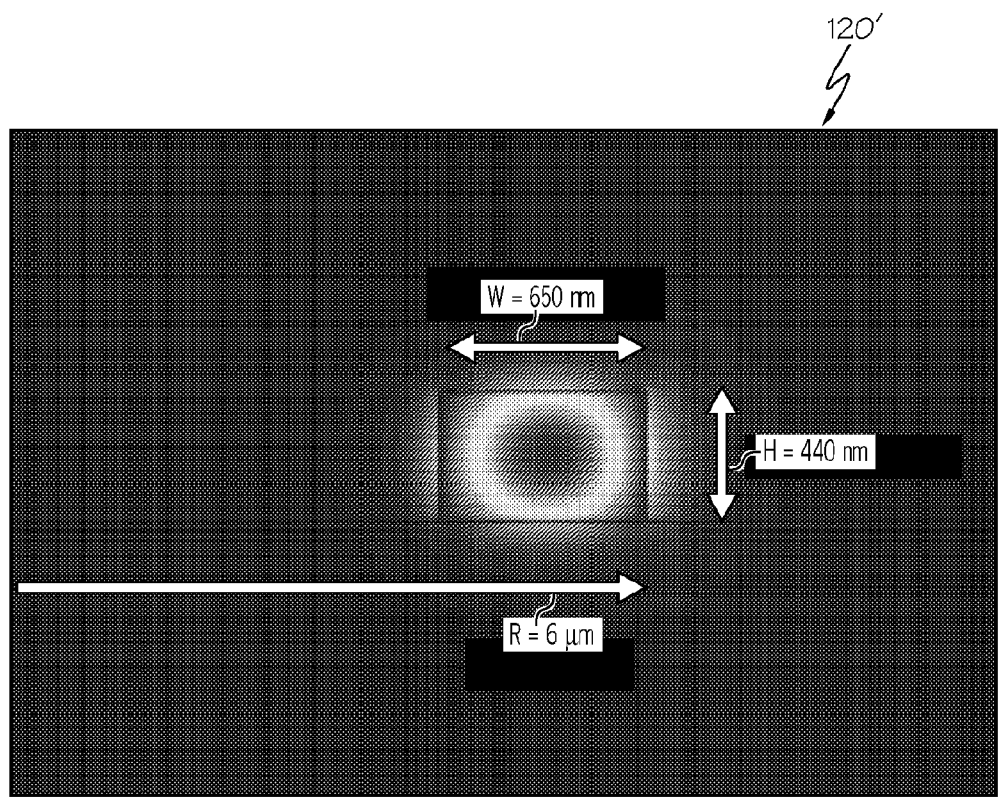
FIG. 7 schematically depicts a cross section of an example closed loop core, according to one or more embodiments shown and described herein.

Referring now to FIG. 7, an example design of an optical ring resonator comprising a closed loop core 120' having a width of 650 nm, a height of 440 nm and a radius of 6 μm is depicted. The closed loop core 120' comprises a ZDW at 1.523 μm and a theoretical optical quality factor Q of greater than $10^{13}$ for the fundamental quasi-TE mode. Assuming that the intrinsic optical Q is $10^6$ (which can be experimentally achieved) and that the closed loop core 120' is critically coupled, the spectral linewidth for the loaded resonant modes is about 0.4 GHz. With a radius of 6 μm, the FSR (i.e., mode spacing distance) of the micro-ring is 20 nm, which is compatible with the channel spacing of the current coarse wavelength division multiplexing (CWDM) technology.

Figure 8:
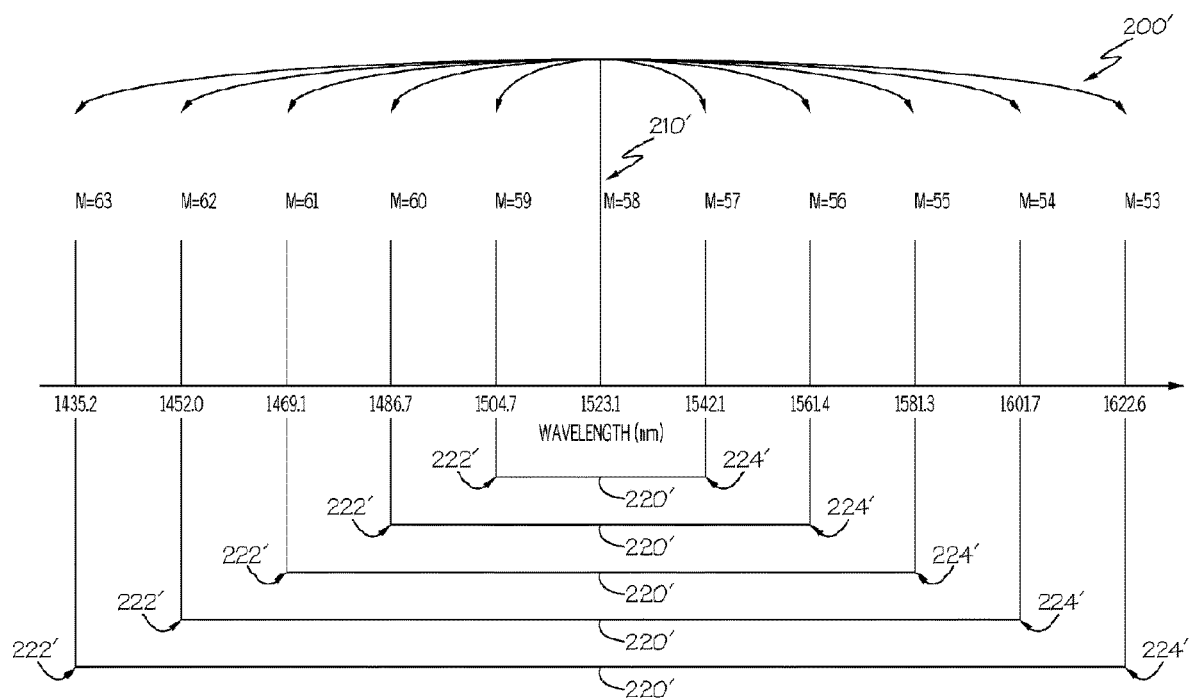
FIG. 8 graphically depicts a plurality of resonant modes of the closed loop core of FIG. 7, according to one or more embodiments shown and described herein.
Figure 9:
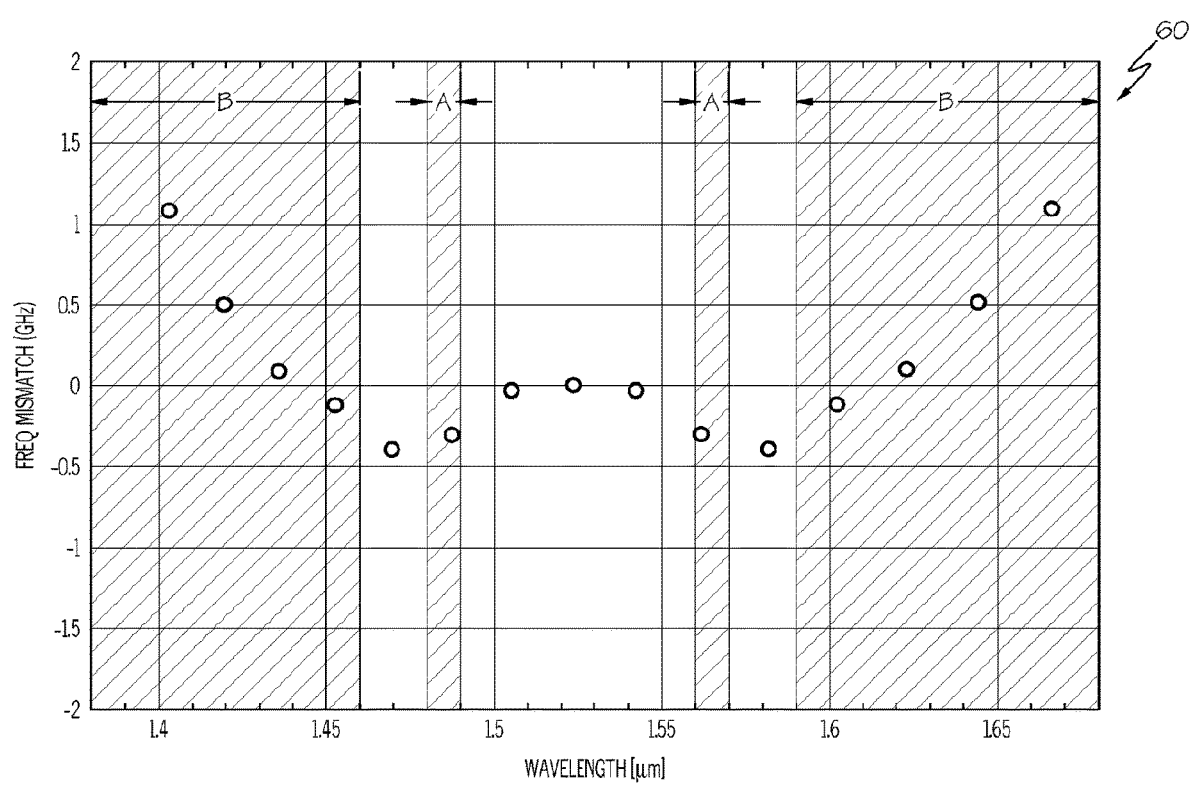
FIG. 9 graphically depicts a frequency mismatch of the plurality of resonant modes of the closed loop core of FIG. 7, according to one or more embodiments shown and described herein.

As shown in FIGS. 8 and 9, when pump photons excite a zero-dispersion resonant mode 210' with a pump wavelength of 1523.1 nm propagate in the closed loop core 120', via SFWM, a plurality of paired signal and idler photons (i.e., quantum-correlated photon pairs) are generated symmetrically located around the zero-dispersion resonant mode 210' such that $2m_p = m_s + m_i$, where $m_p$ is the mode number of the zero-dispersion resonant mode 210', $m_i$ is the mode number of an individual lower wavelength resonant mode 222' for the generated idler photons and $m_s$ is the mode number of an individual higher wavelength resonant mode 224' for the generated signal photons.

FIG. 9 shows a graph 60 depicting the frequency mismatch $(2\omega_p - \omega_s - \omega_i)/2\pi$ of the plurality of resonant modes 200' when the optical ring resonator 110 is pumped at 1523.1 nm. It shows that the frequency mismatch is maintained at a low level (e.g., within ±0.4 GHz) over a wavelength range from 1435.2 nm to 1622.6 nm to achieve broadband photon pair emission. This indicates that the optical ring resonator 110 is able to generate quantum-correlated photon pairs at multiple wavelengths with channel spacing of around 20 nm. More specifically, the optical ring resonator 110 is able to simultaneously generate five groups of quantum-correlated photon pairs in the telecommunication band, which are photon pair group I (signal photon at 1542.1 nm and idler photon at 1504.7 nm), photon pair group II (signal photon at 1561.4 nm and idler photon at 1486.7 nm), photon pair group III (signal photon at 1581.3 nm and idler photon at 1469.1 nm), photon pair group VI (signal photon at 1601.7 nm and idler photon at 1452.0 nm), and photon pair group V (signal photon at 1622.6 nm and idler photon at 1435.2 nm). Moreover, when the micro-ring is pumped at 1523.1 nm with a pump power of 20 based on equation (2), the optical ring resonator 110 generates and outputs quantum-correlated photon pairs with a photon pair emission rate of $1.62 \times 10^8$ pairs per second. Therefore, the $As_2Se_3$ micro-ring based photon pair source (i.e., the optical ring resonator 110) exhibits an ultra-high photon pair generation efficiency with a spectral brightness of $1.0 \times 10^{12}$ pairs/s/mW$^2$/GHz or greater. Furthermore, the broadband photon pair emission can cover the spectral windows of low Raman gain. As shown in FIG. 4B, photon pair group II (signal photon at 1561.4 nm and idler photon at 1486.7 nm) is in spectral window A, and photon pair group VI (signal photon at 1601.7 nm and idler photon at 1452.0 nm) and photon pair group V (signal photon at 1622.6 nm and idler photon at 1435.2 nm) are in in spectral window B, where regions A and B are the two spectral windows of low Raman gain.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An optical ring resonator comprising a closed loop core, a cladding layer, and one or more bus waveguides, wherein:
   the closed loop core is disposed in the cladding layer and comprises $AS_2Se_3$ glass;
   the one or more bus waveguides are disposed in the cladding layer adjacent to the closed loop core, such that the one or more bus waveguides are optically coupled to the closed loop core;
   the closed loop core comprises a zero-dispersion wavelength within a telecommunication wavelength band;
   the closed loop core comprises a plurality of resonant modes, including a zero-dispersion resonant mode corresponding with the zero-dispersion wavelength and a plurality of paired resonant modes;
   the closed loop core comprises a phase matching bandwidth extending greater than ±40 nm from the zero-dispersion wavelength; and
   upon receipt of a plurality of pump photons comprising a pump wavelength, which comprises the zero-dispersion wavelength, the closed loop core is structurally configured to generate one or more quantum correlated photon pairs by a spontaneous four-wave mixing process at paired resonant modes corresponding with wavelengths within the phase matching bandwidth.

2. The optical ring resonator of claim 1, wherein the phase matching bandwidth of the closed loop core extends greater than ±90 nm from the zero-dispersion wavelength.

3. The optical ring resonator of claim 1, wherein the phase matching bandwidth of the closed loop core extends into a spectral window of low Raman gain.

4. The optical ring resonator of claim 1, wherein a mode spacing distance between each adjacent resonant mode of the plurality of resonant modes is from about 10 nm to about 40 nm.

5. The optical ring resonator of claim 1, wherein:
   the closed loop core is structurally configured to generate quantum correlated photon pairs at a photon pair generation efficiency of $1.0 \times 10^{12}$ pairs/s/mW$^2$/GHz or greater; and
   the closed loop core comprises an optical quality factor of $10^6$ or greater.

6. The optical ring resonator of claim 1, wherein the closed loop core comprises a refractive index of from 2.7 to 2.9.

7. The optical ring resonator of claim 1, wherein a maximum spacing distance between a portion of each of the one or more bus waveguides located nearest the closed loop core and the closed loop core is 200 nm or less.

8. The optical ring resonator of claim 1, further comprising a substrate layer, wherein the cladding layer is disposed on the substrate layer.

9. A method of generating one or more quantum correlated photon pairs, the method comprising:
directing a plurality of pump photons comprising a pump wavelength and generated using an optical pump into an input end of at least one of one or more bus waveguides of an optical ring resonator, wherein the one or more bus waveguides are disposed within a cladding layer of the optical ring resonator, adjacent and optically coupled to a closed loop core, such that the plurality of pump photons propagate from the at least one bus waveguide into the closed loop core and propagate within the closed loop core, thereby generating one or more quantum correlated photon pairs by a spontaneous four-wave mixing process, wherein the closed loop core comprises:
$As_2Se_3$ glass;
a zero-dispersion wavelength within a telecommunication wavelength band, wherein the pump wavelength of the plurality of pump photons comprises the zero-dispersion wavelength
a plurality of resonant modes including a zero-dispersion resonant mode corresponding with the zero-dispersion wavelength and a plurality of paired resonant modes; and
a phase matching bandwidth extending greater than ±40 nm from the zero-dispersion wavelength;
wherein the one or more quantum correlated photon pairs are generated by the-four wave mixing process at paired resonant modes corresponding with wavelengths within the phase matching bandwidth.

10. The method of claim 9, further comprising directing the one or more quantum correlated photon pairs from an output end of at least one of the one or more bus waveguides to an optical filter.

11. The method of claim 9, wherein a photon detector is optically coupled to the optical filter such that pump photons received by the optical filter are directed to the photon detector.

12. The method of claim 9, wherein the phase matching bandwidth of the closed loop core extends greater than ±90 nm from the zero-dispersion wavelength.

13. The method of claim 9, wherein the phase matching bandwidth of the closed loop core extends into a spectral window of low Raman gam.

14. The method of claim 9, wherein:
the one or more quantum correlated photon pairs are generated at wavelengths corresponding with each of the plurality of paired resonant modes within the phase matching bandwidth; and
the one or more quantum correlated photon pairs are generated at a photon pair emission rate of $1.62 \times 10^8$ pairs per second or greater.

15. The method of claim 9, wherein:
the one or more quantum correlated photon pairs are generated at a photon pair generation efficiency of $1.0 \times 10^{12}$ pairs/s/mW$^2$/GHz or greater; and
the closed loop core comprises an optical quality factor of $10^6$ or greater.

16. A method of manufacturing an optical ring resonator, the method comprising:
depositing an $As_2Se_3$ film on a first material layer, wherein the first material layer is disposed on a substrate layer;
depositing a patterned resist layer comprising a closed loop pattern on the $As_2Se_3$ film;
etching an exposed portion of the $As_2Se_3$ film, thereby retaining a patterned $As_2Se_3$ film on the first material layer, the patterned $As_2Se_3$ film comprising the closed loop pattern of the patterned resist layer;
removing the patterned resist layer; and
depositing a second material layer on the first material layer and the patterned $As_2Se_3$ film, such that the first material layer and the second material layer collectively form a cladding layer and the patterned $As_2Se_3$ film comprising the closed loop pattern is disposed within the cladding layer, thereby forming a closed loop core, wherein the closed loop pattern comprises a radius of less than 10 µm such that the closed loop core comprises a radius of less than 10 µm.

17. A method of manufacturing an optical ring resonator, the method comprising:
depositing an $As_2Se_3$ film on a first material layer, wherein the first material layer is disposed on a substrate layer;
depositing a patterned resist layer comprising a closed loop pattern on the $As_2Se_3$ film;
etching an exposed portion of the $As_2Se_3$ film, thereby retaining a patterned $As_2Se_3$ film on the first material layer, the patterned $As_2Se_3$ film comprising the closed loop pattern of the patterned resist layer;
removing the patterned resist layer; and
depositing a second material layer on the first material layer and the patterned $As_2Se_3$ film, such that the first material layer and the second material layer collectively form a cladding layer and the patterned $As_2Se_3$ film comprising the closed loop pattern is disposed within the cladding layer, thereby forming a closed loop core wherein a maximum spacing distance between a portion of each of the one or more linear patterns located nearest the closed loop pattern and the closed loop pattern is 200 nm or less such that a maximum spacing distance between a portion of each of the one or more bus waveguides located nearest the closed loop core and the closed loop core is 200 nm or less.

18. A method of manufacturing an optical ring resonator, the method comprising:
depositing an $As_2Se_3$ film on a first material layer, wherein the first material layer is disposed on a substrate layer;
depositing a patterned resist layer comprising a closed loop pattern on the $As_2Se_3$ film;
etching an exposed portion of the $As_2Se_3$ film, thereby retaining a patterned $As_2Se_3$ film on the first material layer, the patterned $As_2Se_3$ film comprising the closed loop pattern of the patterned resist layer;
removing the patterned resist layer; and
depositing a second material layer on the first material layer and the patterned $As_2Se_3$ film, such that the first material layer and the second material layer collectively form a cladding layer and the patterned $As_2Se_3$ film comprising the closed loop pattern is disposed within the cladding layer, thereby forming a closed loop core, wherein the patterned resist layer further comprises one or more linear patterns disposed adjacent to the closed loop pattern such that the patterned $As_2Se_3$ film retained after etching the exposed portion of the $As_2Se_3$ film comprises both the closed loop pattern and the one or more linear patterns such that, after the second material layer is deposited on the first material layer and the patterned $As_2Se_3$ film, the one or more linear patterns of the patterned $As_2Se_3$ film form one or more bus waveguides adjacent the closed loop core, wherein a maximum spacing distance between a portion of each of the one or more linear patterns located nearest the closed loop pattern and the closed loop pattern is 200 nm or less such that a maximum spacing distance between a portion of each of the one or more bus waveguides located nearest the closed loop core and the closed loop core is 200 nm or less.

\* \* \* \* \*

UNITED STATES PATENT AND TRADEMARK OFFICE
CERTIFICATE OF CORRECTION

PATENT NO. : 11,747,709 B2
APPLICATION NO. : 17/619065
DATED : September 5, 2023
INVENTOR(S) : Wei Jiang et al.

It is certified that error appears in the above-identified patent and that said Letters Patent is hereby corrected as shown below:

In the Claims

In Column 14, Line 27, in Claim 1, delete "$AS_2Se_3$" and insert -- $As_2Se_3$ --.

In Column 15, Line 35, in Claim 9, delete "the-four wave" and insert -- the four-wave --.

In Column 15, Line 51, in Claim 13, delete "gam." and insert -- gain. --.

Signed and Sealed this
Thirtieth Day of July, 2024

Katherine Kelly Vidal
*Director of the United States Patent and Trademark Office*